United States Patent Office 3,498,818
Patented Mar. 3, 1970

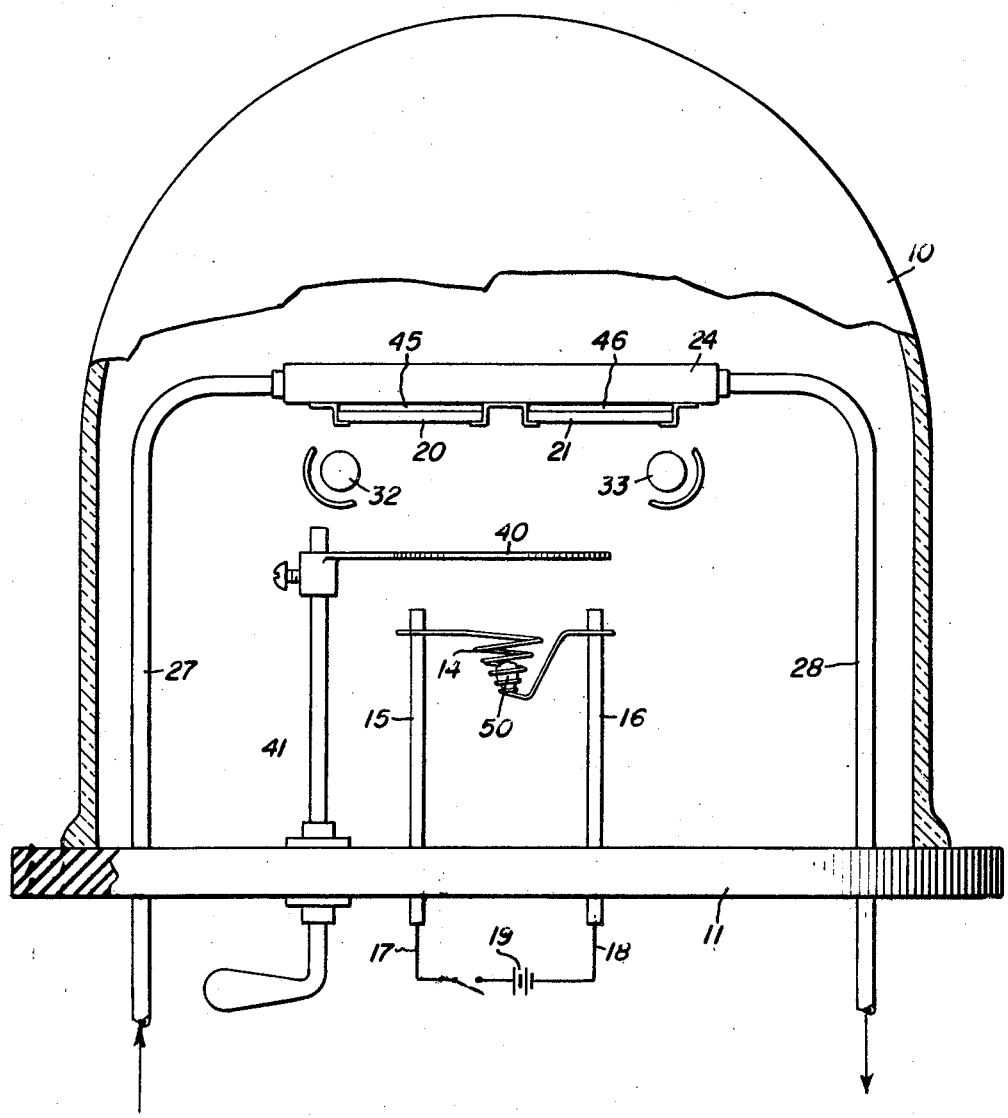

3,498,818
METHOD OF MAKING HIGHLY REFLECTIVE ALUMINUM FILMS
Edward L. Bahm, Ballston Lake, Irvin C. Peabody, Scotia, and Willem Vedder, Latham, N.Y., assignors to General Electric Company, a corporation of New York
Filed Jan. 23, 1968, Ser. No. 699,839
Int. Cl. C03c *17/00*
U.S. Cl. 117—35    7 Claims

ABSTRACT OF THE DISCLOSURE

Aluminum coatings which are both tenaciously-adherent and highly-reflective are produced on glass bodies by a two-stage vapor deposition process which includes as key steps the deposition of a thin first layer of aluminum or silicon monoxide on glass heated to 300° C. followed by the deposition of a much thicker second aluminum layer on the first layer while the glass is at 150° C.

---

The present invention relates generally to the coating art and is more particularly concerned with a new method of making tightly-adherent and highly-reflective aluminum coatings or films, and with the resulting novel articles.

Aluminum films or coatings can readily be provided on the surfaces of suitable substrates such as glass bodies and they can either be tightly-adherent or highly-reflective. Despite the long-standing demand for aluminum films which possess both these virtues, all efforts heretofore to satisfy this demand have, to the best of our knowledge, been unsuccessful.

We have discovered that films of aluminum which are both tightly-adherent and highly-reflective can be provided on glass or quartz bodies or other suitable substrates. In general, this new result is obtained, and the new articles of this invention are produced, by first forming a thin film of aluminum or silicon monoxide on the substrate surface which is at an elevated temperature, and then depositing on the freshly-formed thin film a somewhat thicker film of aluminum while the substrate is at a somewhat lower temperature.

Suitably, the thin film will be of thickness less than 2000 A., preferably about 500 A. The second or thick film, which provides the desired optical characteristics may be several microns in thickness, but preferably will be about one micron thick.

Those skilled in the art will gain a further and better understanding of this invention from the detailed description set forth below taken in conjunction with the drawing accompanying and forming a part of this specification in which apparatus implementing the present invention method is shown in side elevation with parts removed for clarity.

As shown in the drawing, a vacuum bell jar system is employed in carrying out this invention. Thus, bell jar 10 which is vacuum-tightly mounted on base 11 and equipped with conventional vacuum-producing means (not shown) communicating with the interior of jar 10 encloses apparatus for carrying out the vapor deposition operations of this process.

A conical, basket-type tungsten filament 14 for evaporating aluminum is mounted centrally in the lower part of jar 10 on supports 15 and 16 and is connected by leads 17 and 18 to a source of electric power 19. Glass slides 20 and 21 are disposed directly above tungsten filament 14, being held in position against chill block 24 connected to and supported by cooling water lines 27 and 28 by means of which water is circulated through the chill block from a source (not shown) outside jar 10. Two infrared lamps 32 and 33 are situated in the bell jar in proximity to the chill block and in a position to deliver heat directly to glass slides 20 and 21 so that by regulation of the cooling water flow and the heat lamps, the temperature of the glass slides can be closely controlled. Lamps 32 and 33 are connected through switch means to a source of power outside jar 10 (not shown).

A metal shutter or shield 40 is mounted on shaft 41 for movement into position between tungsten filament 14 and slides 20 and 21, as shown in the drawing. This shield can be used to prevent vapor deposition of aluminum vaporized by filament 14 on the glass slides by blocking the straight-line path of vapor travel from the filament vapor source to the slides.

In using the apparatus of the accompanying drawing to carry out the present invention process, glass slides 20 and 21, after being thoroughly cleaned as described in detail below, are clamped to nickel plates 45 and 46 and held against the chill block as shown in the drawing. A one-gram body 50 of very pure aluminum (approximately 99.999 percent aluminum) is disposed in tungsten filament 14 where it can be rapidly heated to its vaporization temperature. With the parts in the positions illustrated in the drawing, the volume within the bell jar is exhausted to a pressure of $10^{-6}$ torr and power is supplied to lamps 32 and 33 until the temperature of the exposed surfaces of the slides as sensed by suitable thermocouple means (not shown) reaches 300° C. The temperature of the slides is maintained at about 300° C. by adjusting the current to the lamps for about one hour and then water is run through chill block 24 until the temperature of the slides reaches 250° C. within about one to two minutes. At the same time, aluminum body 50 is heated quickly to evaporation temperature by connecting filament 14 to its power supply. Thus, when the temperature of the slides reaches 250° C., shutter 40 is opened and a small (about 500 A. thick) but visible amount of aluminum is evaporated on the exposed surfaces of the slides within 10 to 20 seconds. Then the shutter is closed again and power supply 19 is disconnected from filament 14 and evaporation of aluminum body 50 terminates.

The temperature of the glass slides is then promptly reduced to 150° C. within about four minutes by circulation again of water through chill block 24. Power is again supplied to the tungsten filament and the aluminum body is again brought up to evaporation temperature. Shutter 40 is re-opened and the remainder of the aluminum body is evaporated to exhaustion in about two minutes. The second aluminum film so produced on each slide is about one micron thick.

Upon test, it has been found that glass slides coated as described above can be boiled in distilled water without blistering or peeling and that they can also be anodically oxidized to at least 200 volts. It has also been found that when all the aluminum vapor-deposited in this way is deposited on the substrate at a temperature of 250° or higher, only poorly reflective films can be obtained. Additionally, it has been found that the time interval between the deposition of the first small amount or thin film of aluminum and the deposition of the second much thicker film should be as short as possible to minimize excessive contamination of the initial thin film by reaction with whatever small amount of reactive component may be present in the rarified atmosphere within the bell jar.

Slides 20 and 21 should be cleaned thoroughly prior to coating with aluminum in accordance with this invention. Preferably they are cleaned by washing in an aqueous detergent solution, then rubbed with a water slurry of a powder cleaner, rinsed in tap water and then cleaned ultrasonically in boiling distilled water for half an hour. The substrates are then immersed in a 20 percent chromic acid solution for approximately one minute and rinsed in flowing hot tap water and finally rinsed in flowing distilled water or in boiling distilled water. This elaborate cleaning procedure insures that the surface of the slides to be coated with aluminum will be completely clean and free of dirt and films which might impair the application of the tenaciously-adhering, thin, primary coating in accordance with this invention.

As indicated above, the process described in detail can be carried out so as to provide a primary thin coating of silicon monoxide instead of aluminum, the same apparatus being suitable for both of these alternatives. The thickness of the silicon monoxide film and the conditions under which it is deposited, particularly the temperature of the substrate bodies and the level of the vacuum, will preferably be as described above.

It will be understood by those skilled in the art that the new results and advantages of this invention and the new articles of this invention are dependent upon the vapor depositions steps being carried out under critical conditions of vacuum and substrate surface temperature The vacuum will be $10^{-6}$ torr or greater throughout the deposition operations while the temperature of the substrate surface to be coated will be between 200° C. and 400° C. during the thin film deposition step and will be between 50° C. and 150° C. during the thick film deposition step.

In operations in which silicon monoxide is employed in establishing the first thin coating in accordance with this invention, we prefer to evaporate the silicon monoxide from a tantalum boat situated directly below slides 20 and 21 and next to tungsten basket 14. A metal shield is disposed between the boat and basket 14 so that silicon monoxide vapor is not condensed upon the tungsten filament and aluminum body 50. Heating of the silicon monoxide in the boat is suitably accomplished by electrical resistance heating using a power source such as source 19 in the manner described above.

What we claim as new and desire to secure by Letters Patent of the United States is:

1. The method of making highly-reflective and tightly-adherent films of aluminum on a substrate body which comprises the steps of vapor depositing a first thin layer of silicon monoxide or aluminum on a surface of the substrate body at a temperature between 200° C. and 400° C. and in a vacuum of at least $10^{-6}$ torr, thereafter cooling the substrate body to a temperature between 50° C. and 150° C., and vapor depositing a substantially thicker second layer of aluminum on the first layer while maintaining the substrate body in the vacuum.

2. The method of claim 1 in which the second layer is deposited on the first layer within five minutes after the first layer has been formed.

3. The method of claim 1 in which the substrate body is heated to about 300° C. for one hour and then cooled to 250° C. to receive the vapor deposition of the first layer.

4. The method of claim 1 in which the first layer is about 1000 A. thick and the second layer about one micron thick.

5. The method of claim 1 in which the substrate body temperature is about 150° C. when the second layer is vapor deposited on the first layer.

6. The method of claim 1 in which the substrate body temperature is about 60° C. when the second layer is vapor deposited on the first layer.

7. The method of claim 1 in which the substrate body has a glass surface on which the first layer is vapor deposited.

References Cited
UNITED STATES PATENTS

| | | | |
|---|---|---|---|
| 2,748,031 | 5/1956 | Kafig | 117—107 |
| 2,854,349 | 9/1958 | Dreyfus et al. | 117—107 |
| 3,110,620 | 11/1963 | Bertelsen | 117—107 |

ALFRED L. LEAVITT, Primary Examiner

W. E. BALL, Assistant Examiner

U.S. Cl. X.R.

117—71, 107